Sept. 9, 1924.
J. B. HARRIS
COMBINED VEHICLE BUMPER AND ROAD LIGHT
Filed May 31, 1923
1,507,702
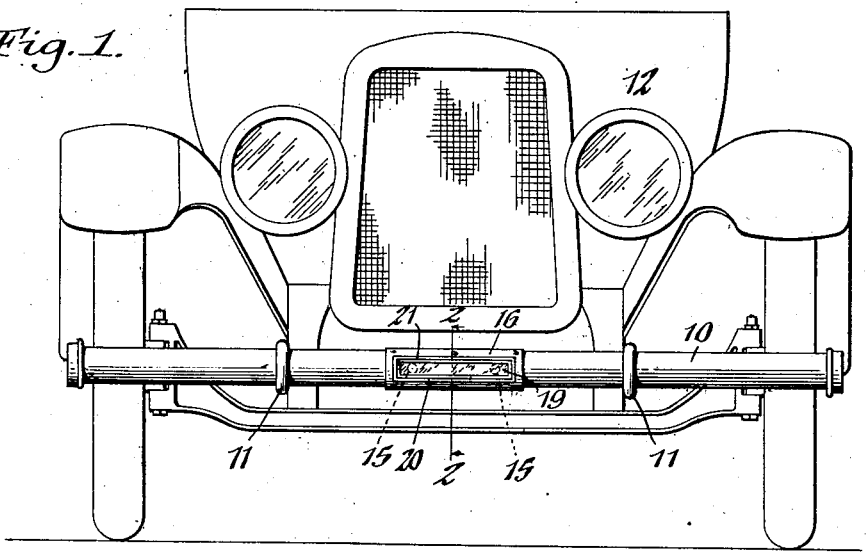
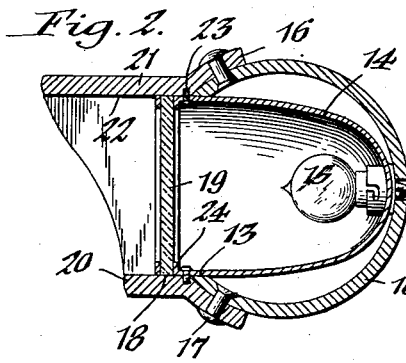
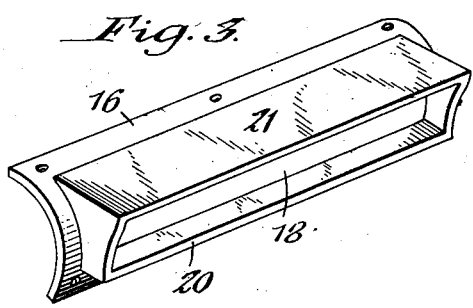
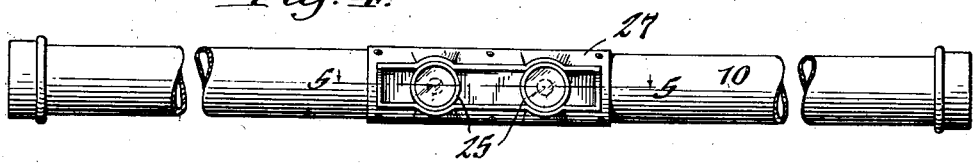
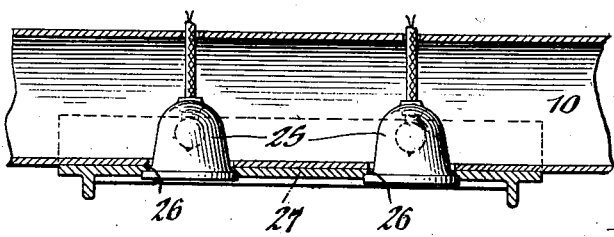
Inventor,
Joseph B. Harris
by Geyer & Geyer
Attorneys.

Patented Sept. 9, 1924.

1,507,702

UNITED STATES PATENT OFFICE.

JOSEPH B. HARRIS, OF BUFFALO, NEW YORK.

COMBINED VEHICLE BUMPER AND ROAD LIGHT.

Application filed May 31, 1923. Serial No. 642,416.

*To all whom it may concern:*

Be it known that I, JOSEPH B. HARRIS, a citizen of the United States, residing at Buffalo, in the county of Erie and State of New York, have invented new and useful Improvements in Combined Vehicle Bumpers and Road Lights, of which the following is a specification.

This invention relates to a bumper for vehicles, particularly automobiles.

One of its objects is to provide the bumper with a built-in lamp for illuminating the roadway at the front and sides of the vehicle.

Another object of the invention is to provide that portion of the bumper containing the lamp with a combined guard or impact member and deflector for protecting the lamp against injury and for directing its light rays downwardly onto the roadway and below the line of vision of approaching automobiles.

In the accompanying drawings: Figure 1 is a fragmentary front view of an automobile equipped with a bumper embodying my invention. Figure 2 is an enlarged transverse section thereof, on line 2—2, Fig. 1. Figure 3 is a detached view of the combined guard and deflector for the lamp. Figure 4 is a front view of a modified form of the invention. Figure 5 is an enlarged horizontal section on line 5—5, Fig. 4.

Similar characters of reference indicate corresponding parts throughout the several views.

The improvement is shown in connection with a bumper consisting of an impact member 10, preferably of tubular form, connected by suitable brackets 11 to the vehicle 12 through the medium of any well known cushioning devices (not shown).

In the embodiment of the invention shown in Figs. 1, 2 and 3, the hollow bumper serves as a lamp-compartment and is provided in its front side with a light opening 13 of substantially rectangular form. Housed within the bumper in line with this light opening is a lamp-body 14 containing one or more electric lamps 15 included in the light circuit of the automobile. In the drawings, two lamps are shown, one located near each end of its body.

Applied to the front side of the bumper over its opening 13 thereof is a combined guard frame and deflector consisting of an attaching plate or base 16 of arcuate form in cross section to conform to the curvature of the bumper. This plate is secured to the latter by rivets 17 or other appropriate fastenings and it is provided with a rectangular opening 18 which registers with the light opening in the bumper. A suitable lens 19 is mounted in any well known manner in the opening of said guard plate. Preferably extending completely around the plate-opening 18 is a forwardly-extending impact rim or flange 20 for protecting the lamps 15 and lens 19 from breakage should the bumper strike an obstruction. The upper portion 21 of this impact rim projects a suitable distance beyond the remaining portion thereof and its inner side is highly finished to form a deflecting surface 22 for directing the light rays from the lamps downwardly.

As shown in Fig. 2, the lamp-body 14, while housed within the bumper, is carried by the guard frame, the same being secured thereto by screws 23. The front end of this lamp-body terminates in an inwardly-bent flange 24 which serves as a backing against which the lens 19 abuts.

In the embodiment of the invention shown in Figs. 4 and 5, the bumper is provided with two separate lamp-bodies 25, 25, instead of one as in the construction previously described. These lamp-bodies extend through openings 26 in the base plate 27 of the guard frame and are suitably secured thereto. In other respects, the guard frame is identical with that shown in Figs. 1–3, inclusive.

While the lamp is shown located centrally of the bumper, it will be understood that one may be placed adjacent either end thereof, if desired.

I claim as my invention:

1. A combined vehicle bumper and roadway illuminator, comprising a hollow impact-member constructed to extend from side to side of a vehicle and provided in its front side with an opening, and a lamp body housed in said impact member and having its front portion arranged in said opening, to illuuminate the roadway in front of the vehicle.

2. A vehicle bumper and road illuminator, comprising an impact-member having a lamp-compartment, said member having an opening in the side of said compartment, a plate applied to said impact member opposite said compartment, and a lamp-body carried by said plate and extending through said opening into said compartment.

3. A vehicle bumper and road-illuminator, comprising an impact-member having a lamp-compartment, said member having an opening in the side of said compartment, a plate applied to said impact member opposite said compartment, a lamp-body carried by said plate and extending through said opening into said compartment, and a light-deflector projecting forwardly from said plate at the upper side of said lamp-body.

4. A combined vehicle bumper and road light, comprising an impact member having a lamp-compartment, and a guard for said lamp-compartment applied to said impact member including an attaching base having an opening for the passage of the lamp-rays, and an impact rim extending forwardly from said base and enclosing said base-opening.

5. A combined vehicle bumper and road light, comprising an impact member having a lamp-compartment, and a guard for said lamp-compartment applied to said impact member including an attaching base having an opening for the passage of the lamp-rays, and an impact rim extending forwardly from said base and bounding said base-opening, the top portion of said rim projecting beyond the remaining portions thereof and forming a deflector for the lamp.

6. A combined vehicle bumper and road light, comprising an impact member having a lamp-compartment, said member having an opening in the side opposite said compartment, a guard plate applied to the impact member and having an opening therein in line with the opening of said impact member, said guard plate having a forwardly-projecting impact rim surrounding its opening, a lens for said last-named opening, and a lamp-body carried by said guard plate and extending through the opening in the impact member into said compartment, the front end of said lamp-body having an inwardly-bent flange against which said lens abuts.

JOSEPH B. HARRIS.